Patented Sept. 23, 1941

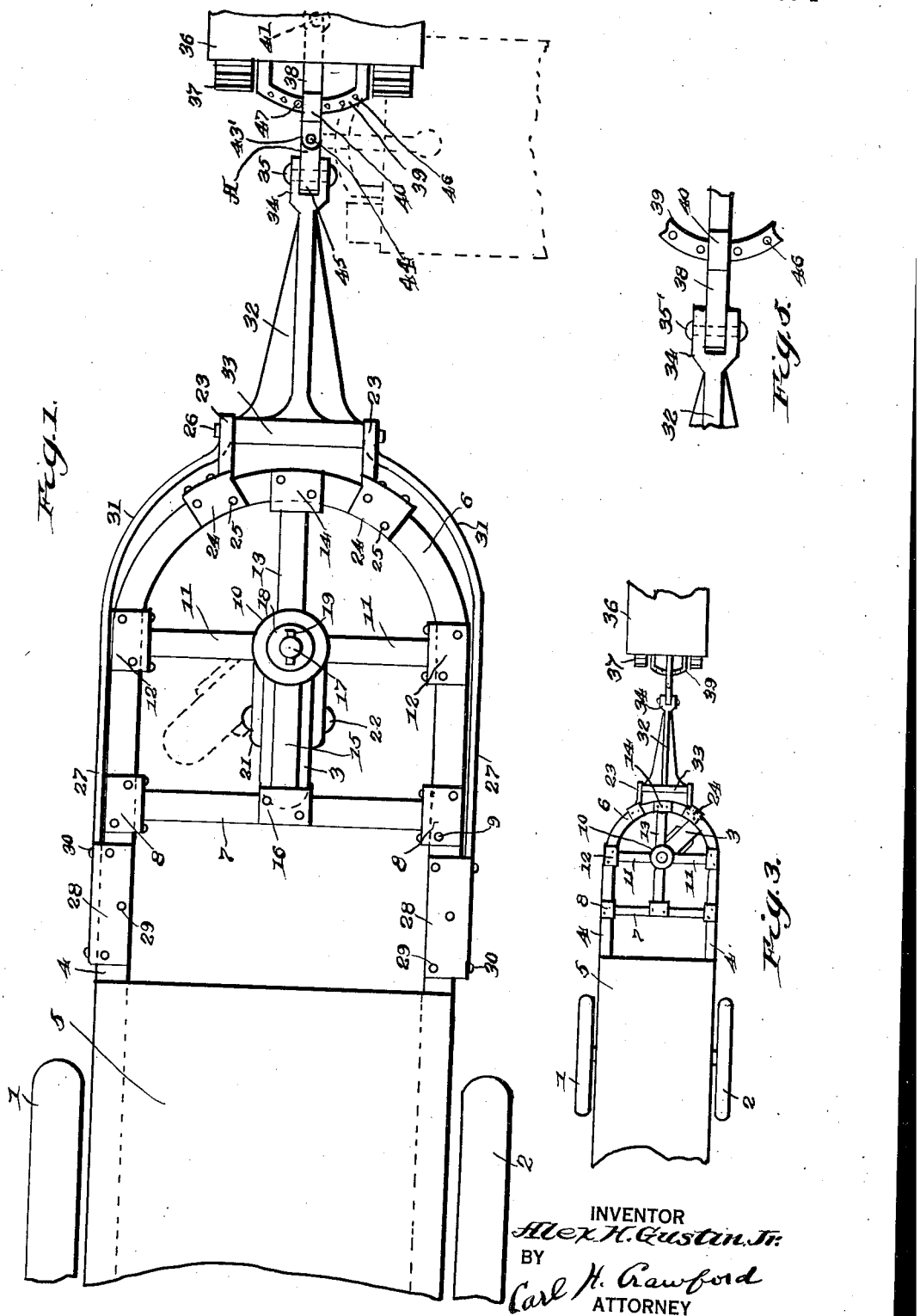

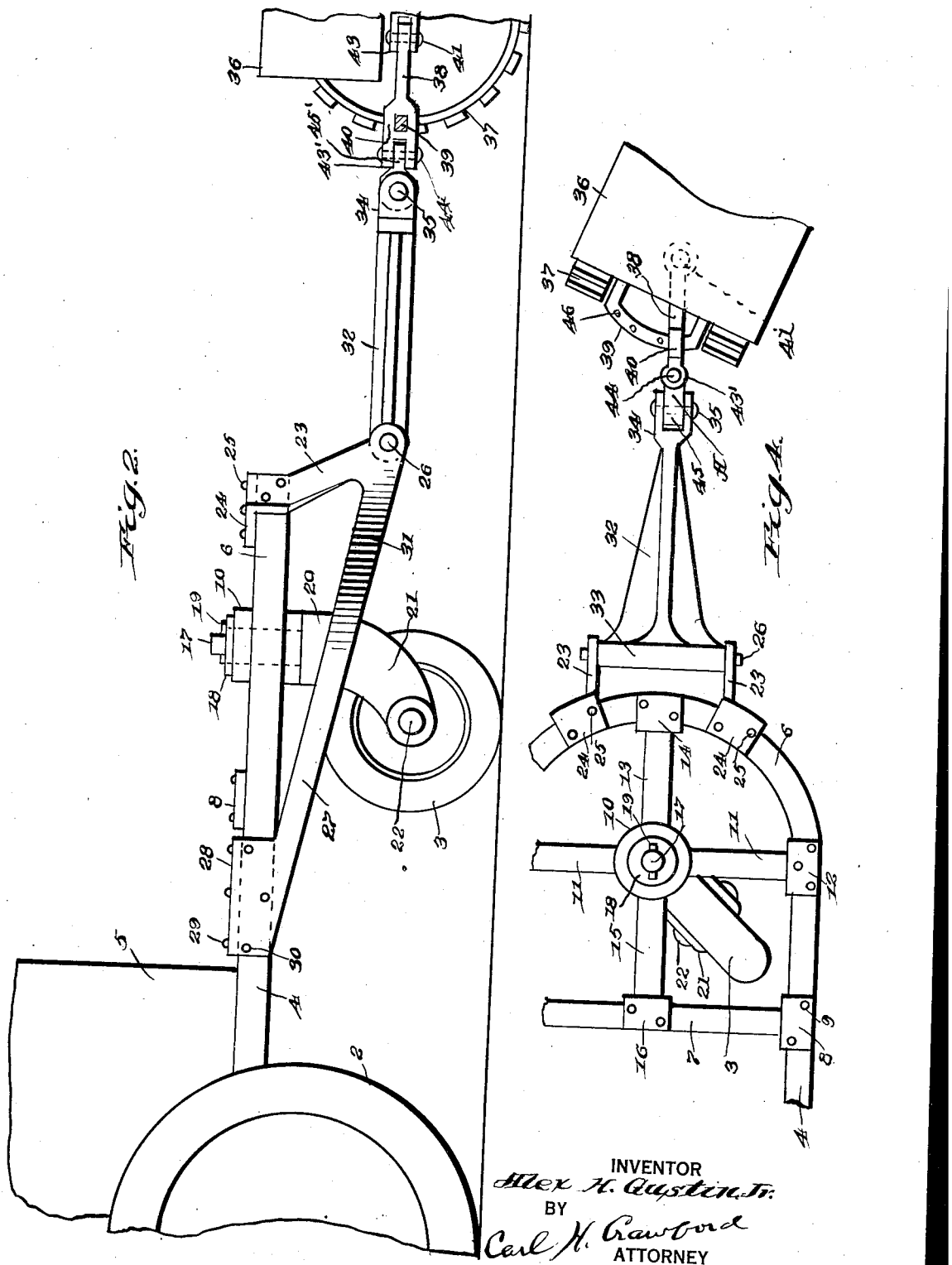

2,256,557

UNITED STATES PATENT OFFICE 2,256,557

STEERING COUPLING MECHANISM

Alex H. Gustin, Jr., Rosalia, Wash.

Application August 30, 1940, Serial No. 354,863

1 Claim. (Cl. 280—62)

The object of this invention is to provide an improved steering coupling for heavy duty trailers drawn by a hauling mechanism, and the invention is specifically intended for use in connection with three wheeled combines drawn by tractors.

Heretofore, these combines, which have two rear supporting wheels and a front swiveled wheel, have been equipped with a coupling device in draft connection with the swiveled front wheel, and since the coupling was pivoted to the draw-bar of the tractor, the coupling would "jack-knife" when the tractor was backed up, or when, on down grades, the combine ran up on to the tractor. This was because the draft was imposed upon the swiveled connection of the front wheel, hence when the usual tongue of this type was caused to "jack-knife" all steering function was not only lost, but the front wheel was shifted to the "jack-knife" position of the tongue and the combine was necessarily detoured out of the desired path of travel.

It is one of the features of this invention to provide such a three wheeled combine with a front wheel which is swiveled to the combine, and which is in the form of a castor wheel, and to permit of absolute and unrestrained freedom of movement of said castor wheel so that it can take any swiveled position responsive to the thrust imposed upon it by various forward turning or backing-up movements of the combine.

A further feature consists in a tongue mechanism which is connected at its rear end directly to the main frame of the combine in a manner to be held in fixed longitudinal alinement therewith at all times, so that it can advantageously perform the steering function for the combine, and also maintain the latter in a uniform distance behind the tractor, either in advancing or backing-up movements.

The invention is specifically intended for use in connection with tractors having a horizontally supported draw-bar pivoted to the tractor to swing about a vertical axis, and it is a feature to provide a tongue mechanism connection with the draw-bar of such a construction as to maintain the tongue mechanism and draw-bar in fixed alinement during any advancing or backing up movements of the combine.

In some forms where it is desired to provide for sharp turning movement of the tractor, it is a feature to incorporate in the tongue mechanism a swivel or pivotal connection such as will permit sharp turning movement of the tractor without altering the fixed alinement relation of the tongue mechanism with the combine frame after a normal relationship has been restored.

It is also a feature of the invention to incorporate certain units into the improved coupling so as to afford flexibility whereby the tractor and combine may have relative up and down movement with respect to each other over rough fields where rain has formed ditches therein.

The invention has many other features and objects which will be more fully described in connection with the accompanying drawings, and which will be more particularly pointed out in and by the appended claim.

In the drawings:

Fig. 1 is a plan view of one form of the invention showing the parts in full lines in the position they would assume in either advancing or backing up the combine, and showing in dotted lines the manner in which the tractor can make a sharp turn.

Fig. 2 is a view in side elevation of the parts shown in Fig. 1, with the draw-bar guide in section.

Fig. 3 is a plan view similar to Fig. 1, on a reduced scale, showing how the castor wheel is free to take an angular position when the combine is being backed up.

Fig. 4 is a fragmentary plan view of the front end of the combine illustrating the manner in which the tractor can be turned to steer the combine in backing up and also showing how the castor wheel can take a trailing position responsive to the rearward movement of the combine.

Fig. 5 shows a modified form of coupler.

Like characters of reference designate similar parts throughout the different figures of the drawings.

The combine has been shown in very general form with all details not pertinent to the invention entirely eliminated. This type of combine has two rearwardly disposed supporting wheels, and a front wheel, which, according to the present invention is a swiveled castor wheel 3, on which the entire weight of the main frame is supported at the front end of said frame. A main frame is shown having longitudinal frame members 4, on which the main body 5 of the combine is mounted, this being, strictly speaking, the housing for the combine mechanism. I have omitted the draper and sickle which extend from the right of the combine because such portions are not material to an understanding of the invention.

Reverting to the main frame, the same is shown having the usual semi-circular front end portion 6, which may be joined to or formed as an integral part of the longitudinal or side frame members 4. I have shown the side members 4 braced by a transverse member 7, having its ends 8 rigidly secured to said side member 4 by rivets or like means 9. A bearing 10 is vertically disposed in said main frame and may be disposed axially of the center from which the semi-circular front end is struck, but not necessarily so. Said bearing 10 is shown provided with arms 11 having their ends 12 rigidly secured to said side members 4, and with an arm 13 having its front end 14 rigidly secured to the front end 6 of said frame. An arm 15, extending from said bearing 10, has its end 16 rigidly secured to said transverse brace 7.

Thus it will be seen that said bearing 10, and its various arms, form a kind of spider whereby said bearing may be firmly held in the vertical position shown.

A shaft 17 is rotatively journaled in said bearing 10, and may be equipped with a washer 18, and be held against removal in one direction by a pin 19. Said shaft 17 may form an integral part of a forked frame 20 having castor arms 21 to afford a castor or trailing action for wheel 3, and the latter is journaled in said arms 21 by a shaft 22.

Thus it will be seen that the wheel 3 is swiveled in the main frame, and that the frame portion 20 forms a shoulder so that the front of the main frame is supported wholly by said castor wheel 3. It will be further noted that the castor wheel 3 is free and unrestrained for movement in any direction about its vertical axis, responsive to the thrust imposed by movement of the combine.

It will be noted that the main frame is supported by the rear and castor wheels in a horizontal position, and at a relatively high elevation with respect to the elevation of the draw-bar of the average tractor. Now it is a feature of this invention to provide means such as a drop frame, whereby the line of draft from the tractor to the combine will be as nearly horizontal as possible, and I will next describe this feature of the invention.

Said drop frame may, as shown, be made in separate identical sections and as both are alike in form and function, the same reference letters will be applied to both sections, and a description of one section will suffice.

A tongue supporting arm 23 has its upper end 24 rigidly secured as by means such as rivets 25 to the front and top of the main frame and the lower end of said arm is provided with a suitable pivot opening for reception of a pivot spindle 26. Said section preferably includes an integrally formed frame member 27, which extends rearwardly and upwardly and is provided with a flanged end 28 that is shown rigidly secured by means such as rivets 29 and 30 to the top and side of frame member 4. As shown in Fig. 1, the forward portion of this member 27 is curved inwardly at 31 to prevent such member from digging into the ground when the combine enters a ditch. It will be seen that this frame member 27 is adapted to take the severe stresses imposed by the draft, and by backing up, and hence such member takes the stresses both in tension and compression. Therefore, the arm 23 is relieved and supported against such stresses being localized on it, and the stresses on the main frame are also properly distributed. It will also be seen that the member 27 is connected to the main frame in the rear of the mounting of castor wheel 3. In the absence of member 27 the arm 23 would have to be made extremely heavy and the stresses imposed on the main frame would be torsional.

Reference will next be made to the improved tongue mechanism.

Said mechanism includes a T-shaped tongue 32 suitably ribbed as shown to stiffen the same. At its rear end, said tongue is provided with a pivot sleeve 33, extending laterally of the longitudinal axis of said tongue and through which pivot spindle 26 extends so that the rear end of the tongue will be pivotably mounted to tilt or swing about a horizontal axis. However, said arms 23, which rigidly engage the ends of sleeve 33, hold the tongue in fixed alinement and against lateral movement with respect to the main frame. Since the tongue is connected centrally of the main frame, it will be held in fixed relation with the longitudinal axis of said main frame; in other words, the longitudinal axis of the tongue and main frame will always coincide. The front end of said tongue is designed to have a pivotal draft connection in a manner to retain the pivotally connected part in fixed longitudinal alinement with said tongue, and in the present construction the front end of said tongue is provided with a forked jaw 34 through which a horizontally disposed pivot pin 35 extends.

Reference will next be made to the manner and means of connecting the tongue to a draw-bar in a manner to provide for a pivotal connection such as will permit of a sharp turning movement of the tractor, as in the main form, or a connection such as shown in Fig. 5, where the draw-bar is directly connected with the tongue.

The rear body of a tractor is indicated at 36, the same having track layers 37 and a draw-bar 38. A guide 39, preferably arcuate, has slidable engagement with the draw-bar 38, the latter being shown as having an enlargement 40, through which the guide 39 extends. The forward end of said draw-bar 38 is shown pivoted at 41 about a vertical axis to a part 43 of the tractor, so that the rear end of the draw-bar may swing in lateral directions, the draw-bar being at all times supported in a horizontal position.

The free end of the draw-bar 38 is provided with a forked jaw 43', through which a vertically disposed pivot pin 44 extends, this jaw forming one part of a clevis member. The remaining part of the clevis member is formed by a unit A having its end 45 disposed between the forked jaw 34, and pivoted by pin 35. The other end 45' of said unit A is disposed between the forked jaw 43' and is pivoted thereto by pin 44, which is vertically disposed. Thus it will be clear that the tongue mechanism has incorporated therein one or more units affording relative up and down movement of the tractor and combine over rough ground.

In the modified form shown in plan view in Fig. 5, the tongue 32 has its forked jaw 34 directly connected with the draw-bar 38 by a horizontally disposed pivot pin 35', and the coupling unit A is omitted.

It may be stated that the guide bar 39, which is mounted rigidly on the tractor, is provided with a plurality of openings 46, and whenever it is desirable to limit lateral shifting movement of the draw-bar 38, stop pins, as indicated at 47, may be inserted. For example, when hauling a combine around a hill it is hauled in a clockwise direction, looking down, and hence the turn of the tractor is always to the right, and this is a usual practice which has been stated for information only. In the use of this invention, such stop pins can, if desired, be omitted entirely, and certainly will be omitted in many uses of the steering coupling. It is seldom, in any use of a tractor, that stop pins are placed on both sides of the draw-bar.

While the operation may be clear from the foregoing, it will be briefly recapitulated as follows:

As distinguished from a mere coupling means, it is desired to emphasize the fact that this invention, in addition to its coupling function, also performs a steering function which latter is of vital importance in backing up the combine, which is often necessary. The reason why this coupling can perform a steering function when backing up is because it cannot "jack-knife."

In the following description, the stop pin 47 will be ignored, and the operation will be explained as though such stop pin were not used.

In Fig. 1, the tongue mechanism is shown, and the tractor and combine are in the position they would assume in a straight pull, or when backing up along a straight line. In a straight pull alinement of parts takes care of itself. However, within the scope of any gradual turn of the tractor, less than a sharp turn, it will be seen that the tongue 32 and the draw-bar 38 will always be in longitudinal alinement from the pivot 41 throughout the length of the tongue and throughout the length of the combine. This is due to the fact that the forked jaw 34 constitutes a structural part or means which holds the unit A rigidly against turning movement, in spite of the pivotal connection at 44. In other words, this pivotal connection at 44 with unit A does not function at all in straight ahead advancing, or slight turning of the tractor within the range of turning provided by the supporting guide 39. In all tractors this guide is of a length to provide for any normal or necessary turning movement of the tractor to the right or left.

Now assuming that it was desired to make a sharp turn, then and in that event the tractor would be operated in the usual manner by reversing the track layers 37 and turning the tractor in the manner shown in dotted lines in Fig. 1, and of course during this time the combine would remain substantially at rest. This is the usual way of starting to turn the combine around near one edge of the field. This is where the pivotal connection 44 comes into play to permit the usual alined relation between the draw-bar and tongue to be displaced, and it will be seen that this can be done automatically, and without requiring any adjustment or special rearrangement of any of the parts. It will of course be understood that during all the heretofore described movements, and in fact any other movements of the tractor and combine, the guide bar 39 will support the draw-bar and tongue in a substantially horizontal position, and because of the improved drop frame 23, the line of pull, or the line of retraction, will always be substantially horizontal, and hence the stresses in either direction will not cause the castor wheel 3 to "dig into the ground," as would be true if the coupling were inclined from the main frame down to the draw-bar, or if draft pull were directly applied to the front wheel.

Now in completing a sharp turn, it will be seen that the tongue 32 is held by the arms 23 in fixed alinement with the longitudinal axis of the combine, and that the castor wheel 3, as shown in dotted lines in Fig. 1, is absolutely free and unrestrained to facilitate this turning movement of the combine by taking a trailing position responsive to the direction imparted to the combine. Of course, the two rear wheels also facilitate this turning movement by freely reversing their rotation responsive to the turning thrust imposed by the tractor. After the combine has been turned around the parts of the steering coupling will automatically again assume the full line position shown in Fig. 1.

In Fig. 5, I have shown how the tongue can be directly connected with the draw-bar 39 to retain the two in longitudinal alinement, omitting the unit A, and the invention would be clearly and advantageously operable in this form for any turning movement of the tractor except the sharp turning movement shown in Fig. 1.

In order further to illustrate the steering function of the coupling mechanism, reference is next made to Fig. 3, wherein the tractor has just started to back up the combine in a straight line, and castor wheel 3 is just partly turned into a full trailing position. Thus, instead of "jack-knifting" the coupling mechanism is held in rigid alinement with the draw-bar so that the combine may be accurately directed on a straight line of retraction to any desired position.

In Fig. 4 I have shown how the tractor can be turned laterally from the alined position shown in full lines in Fig. 1, when it is desired to back up the combine in a manner to change the position thereof from a straight line of travel, the wheel 3 having just started to change its position. Thus, it will be clear that the tongue 32 and draw-bar 38 are in complete alinement with each other and with the longitudinal axis of the combine.

It will be understood that the importance of this lengthwise unyielding coupling mechanism is just as important in preventing the combine from running up onto the tractor on a downhill grade, as in backing up.

It is also desired to emphasize the fact that with the sole exception of making a sharp turn this coupling and steering mechanism which extends from the main frame to the draw-bar, has incorporated therein units which permit of flexibility about one or more horizontal axes, so as to permit relative up and down movement of the combine and tractor while traversing rough ground, and with the exception of making sharp turns the tongue and draw-bar are always held in alined relation.

It is believed the invention will be clear from the foregoing description, and while I have herein shown and described one form of the invention I do not wish to be limited thereto, except for such limitations as the claim may import.

I claim:

A fixed alinement steering and draft coupling for a heavy duty three wheeled trailer with a supporting wheel in front and having a main frame disposed at a relatively high elevation and a tractor provided with a horizontally supported laterally swinging draw-bar disposed at a relatively low elevation with respect to said main frame, comprising, a drop frame rigidly secured to the front of said main frame and having spaced depending arms provided with pivot openings at substantially the level of the draw-bar, a T-shaped tongue having a transverse sleeve on its rear end extending laterally of the longitudinal axis of said tongue and pivoted in said openings on a horizontal axis between said arms and held thereby in fixed alinement with the longitudinal axis of said main frame, said drop frame having members rigidly attached to said main frame rearwardly from said supporting wheel and adapted to sustain stresses in tension and compression, and means pivotally connecting the front end of said tongue with the draw-bar and having portions structurally holding said tongue and draw-bar in fixed alinement during advancing steering and backing-up movement, and said front wheel being a castor wheel and being swivelled to said frame and free to assume any trailing position under stress imposed by various movements of said trailer.

ALEX H. GUSTIN Jr.